United States Patent [19]

Garcia

[11] 3,830,963

[45] Aug. 20, 1974

[54] SYSTEM FOR DATA COMPRESSION BY DUAL WORD CODING HAVING PHOTOSENSITIVE MEMORY AND ASSOCIATED SCANNING MECHANISM

[75] Inventor: Jose E. Garcia, Lexington, Ky.

[73] Assignee: International Business Machines Corporation, Armonk, N.Y.

[22] Filed: Dec. 11, 1972

[21] Appl. No.: 313,898

[52] U.S. Cl. .............................. 178/6, 178/DIG. 3
[51] Int. Cl. .............................. H04n 7/12
[58] Field of Search .............................. 178/6, DIG. 3; 235/61.11 E

[56] References Cited

UNITED STATES PATENTS

| | | | |
|---|---|---|---|
| 3,689,900 | 9/1972 | Chen | 340/173 LM |
| 3,739,085 | 6/1973 | Rosen et al. | 178/6 |
| 3,748,379 | 7/1973 | Epstein et al. | 178/6 |

*Primary Examiner*—Howard W. Britton
*Assistant Examiner*—Michael A. Masinick
*Attorney, Agent, or Firm*—D. Kendall Cooper

[57] ABSTRACT

A data compaction method is proposed for encoding run lengths of black and white information (or any two grey levels) as pertaining to facsimile. A mechanical scanner and a semiconductor memory are joined into a compact solid state device incorporating variable rate scanning with virtually no scanning speed limitations.

3 Claims, 15 Drawing Figures

SYSTEM FOR DATA COMPRESSION BY DUAL WORD CODING HAVING PHOTOSENSITIVE MEMORY AND ASSOCIATED SCANNING MECHANISM

BACKGROUND OF THE INVENTION AND PRIOR ART

Coding

Original data has inherent redundancy which can be efficiently reduced by run length encoding, that is, encoding the distance (i.e., length of run) between significant bits. A normal page of text has relatively little information and quite a bit of redundant background.

Once obtained, run lengths may be encoded by fixed or variable word length codes. Variable word length codes (such as a Golomb code) are usually more efficient but require more computation and are prone to false interpretation due to transmission errors. Fixed word length codes are usually less efficient but generally easier to compute and detect. One class of codes known as linked fixed word length codes combine the favorable points of the two above. This class of codes consists of a fixed word length codeword which can be linked with another codeword of fixed length to form a message. This message is used to indicate a run length longer than the maximum allowable for one word. The efficiency of these codes are dependent upon the word size used, which in turn is dependent upon the probability distribution of the run lengths. An efficient word length for encoding data obtained while scanning at 125 picture elements per inch is four bits long.

Typical art in this area is U.S. Pat. No. 3,471,639 making use of run length encoding with a format generator and shift registers for handling a limited case transmission situation. The U.S. Pat. No. 3,185,824 describes an adaptive compression scheme using run length counting.

Memory and Scanner

Variable speed scanning is desirable in any high-speed facsimile machine using redundancy removal techniques to achieve higher rates of information transmission. This is due to the fact that the instantaneous data rate out of the redundancy removal encoder may be quite different from the data rate into the encoder from the scanning system. One solution is to scan at the rate of the fastest data rate out of the encoder. This is not feasible because of mechanical speed limitations in most scanner systems. Another solution is to buffer an entire document's worth and look at each bit at the desired rate with the logic involved.

Even if the latter solution is used, the scan rate will not be truly variable since data has to be placed in the buffer in a serial-by-bit manner so that the logic may deplete the buffer causing the encoder and, therefore, the transmission system to have to wait until more data becomes available.

A typical photo-memory in this area is represented by the U.S. Pat. No. 3,689,900.

SUMMARY OF THE INVENTION

Dual Word Coding

Up to now the method of encoding the run lengths obtained between information bits has been described, but not the information bits themselves. In most coding schemes these bits are transmitted serially bit by bit, thereby not exploiting their inherent redundancy. In one coding scheme a codeword of length zero is sent every time two black (of information) bits are found together. The proposal herein codes the length of run of these information bits also, also using a linked fixed word length code. This coding scheme is the most optimum scheme found thus far not using inter-line dependency as a means for redundancy removal. In most instances, though, this scheme closely matches the performance obtained by the use of four-point predictive coding with inter-line dependency.

The efficiency of the dual word coding scheme will increase as the resolution of scan is increased since the lengths of information runs will increase due to the increased rate of sampling. For 125 picture elements per inch it can be shown that the dual word coding scheme gives approximately 50 percent increase in compression ratio over the scheme where only run lengths of white are coded and a run of length zero is inserted between two adjacent information bits. A four- and a two-bit word length for coding white and black run lengths, respectively, have been used.

A matrix full-page memory is used in an effort to eliminate wasted wait time, thereby decreasing the time required for transmission of facsimile copy. Furthermore, the buffer cost is effectively halved since only one active device per bit is required instead of the pair of active devices currently used in some devices.

Objects

The primary object of the present invention is to provide a system for achieving data compression in a highly efficient manner and particularly involving a one-dimensional method of coding in which only a preceding bit of information needs to be stored. Another object of the invention is to provide a photosensitive memory-scanner system of simplified form and offering a variable scan rate and serving as a page buffer.

The foregoing and other objects, features, and advantages of the invention will be apparent from the following more particular description of the invention as illustrated in the accompanying drawings.

DRAWINGS

In the Drawings

Figure 7A:
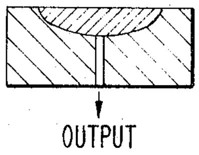
Figure 7B:
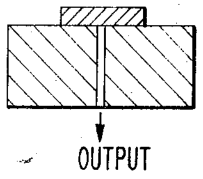

FIGS. 7*a* and 7*b* illustrate several versions of the photosensitive elements.

Figure 8:
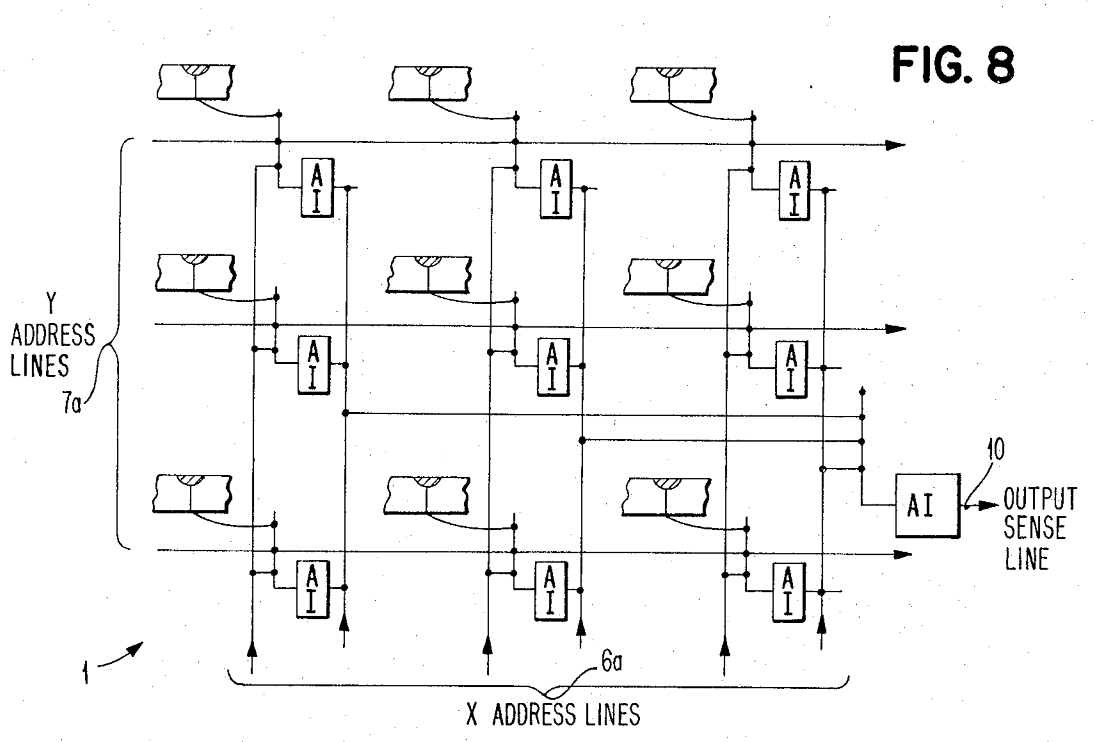

FIG. 8 is a detailed diagram of the memory-scanner incorporating photosensitive elements and having provision for addressing particular locations in the memory.

Figure 9:
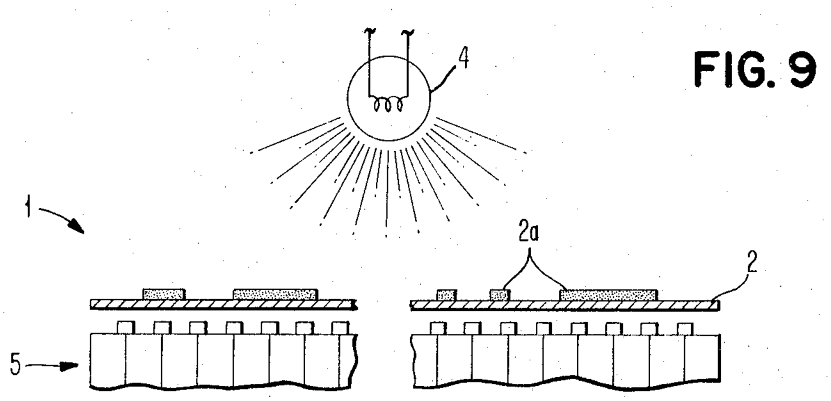

FIG. 9 illustrates the memory of FIG. 8 in actual use as a scanning device for scanning an original document.

DETAILED DESCRIPTION

Illustration of Dual Word Coding

The data compaction method proposed for encoding run lengths of black and white information (or any two grey levels) as pertaining to facsimile will first be described.

This is a one-dimensional method of coding which not only exploits the redundancy contained in the background or white bits of printed material, but which also uses the redundancy inherently contained in the information bits as well. This scheme of coding uses a dual word concept, thereby coding the runs of one color with a codeword different from that which is used to code a run of the same length in the opposite color. These codewords are most efficiently assigned after knowing a priori the probability distribution of the run lengths or using a pre-scan or adaptive scheme to obtain them for each separate document. The efficiency of this coding scheme closely matches that obtained by sophisticated two-dimensional schemes such as predictive coding using inter-line dependency.

Every time that an end of run is detected a flip flop is made to change states. The logic at the encoder or decoder is thus advised that a new run, of color opposite to that of the previous run, is beginning. The logic (either two different sets of logic for each of the two word lengths or one set capable of switching modes) therefore will alternate between encoding or decoding black and white run lengths.

AN EXAMPLE OF DUAL WORD CODING

Raw data:

```
    12        2  5   4  2    7       9          Note: 0=white,
000000000000 11 00000 1111 00 1111111 000000000       1=black.
   C4l4      22  54   L2l2 24 L2L2l2    94
```

Coded data:

```
11000001  010101110000101111100  1001
 C   1    2  5  L 1  2  L L 1     9
```

| 4 Bit Code for White RL | | 2 Bit Code for Black RL | |
|---|---|---|---|
| 0000 | =0 | 00 | =1 |
| 0001 | =1 | 01 | =2 |
| 0010 | =2 | 10 | =3 |
| 0011 | =3 | 11 | =L |
| 0100 | =4 | | |
| 0101 | =5 | | |
| 0110 | =6 | | |
| 0111 | =7 | | |
| 1000 | =8 | | |
| 1001 | =9 | | |
| 1010 | =A | | |
| 1011 | =B | | |
| 1100 | =C | | |
| 1101 | =D | | |
| 1110 | =E | | |
| 1111 | =F | | |

Typical actual weights assigned to the code words are as follows:

Dual Mode Run Length Code

White (Pseudo-Hexary) Position

| Symbol | 1 | 2 | 3 | 4 | |
|---|---|---|---|---|---|
| 0 | 0 | | | | |
| 1 | 1 | | | | |
| 2 | 2 | | | | |
| 3 | 3 | | | | |
| 4 | 4 | | | | |
| 5 | 5 | | | | |
| 6 | 6 | | | | |
| 7 | 7 | | | | |
| 8 | 8 | | | | |
| 9 | 9 | | | | |
| A | 10 | | | | |
| B | | 0 | 0 | 0 | Link Codes |
| C | | 11 | 55 | 275 | Link Codes |
| D | | 22 | 110 | 550 | Link Codes |
| E | | 33 | 165 | 825 | Link Codes |
| F | | 44 | 220 | 1100 | Link Codes |

Black (2 Bit Linked Word) Position

| Symbol | 1 | 2 | 3 | |
|---|---|---|---|---|
| 00 | 1 | | | |
| 01 | 2 | | | |
| 10 | 3 | | | |
| 11 | | 3 | 3 | Link Code |

Table Entries Denote Weight Assigned to Each Symbol.

At the end of each scan (or periodically at intervals which may be shorter or longer than a scan line depending upon error rate or the transmission medium) an end of scan code is sent using whatever word length is necessary. This is done to signify that a "sync" point needs to be established and that the next run coded will be of a color arbitrarily specified beforehand. As could be expected, for most documents this "sync" color will be white since the margin is the first thing to be sent in each line. If this first run after the "sync" point is of a color opposite to that arbitrarily specified, then a run of length zero of the first color must be sent.

The example below uses two specific sets of linked fixed word length codes, but any set of these codes as well as any other set of codes for encoding of run lengths could have been used just as well.

System Operation, FIGS. 1, 4*a*, 4*b*, 5*a*, and 5*b*

Figure 1:
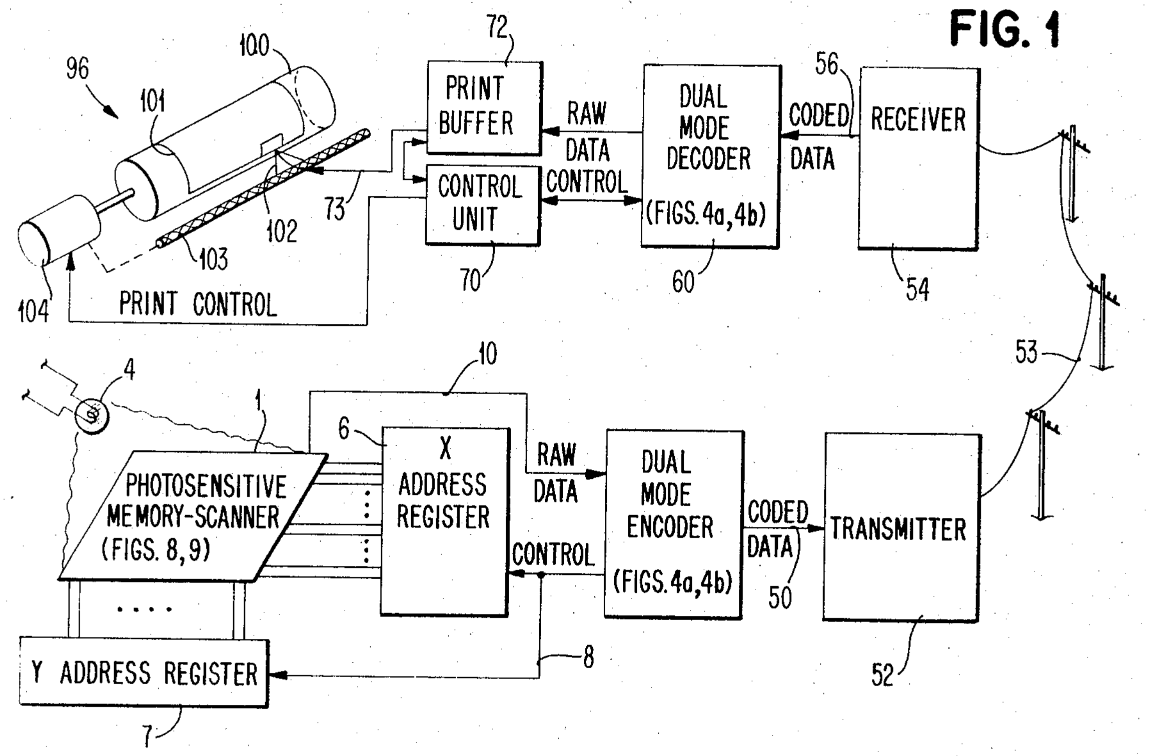
FIG. 1 is a facsimile system incorporating various features of the present invention including the dual word coding and the memory-scanner.
Figure 2:
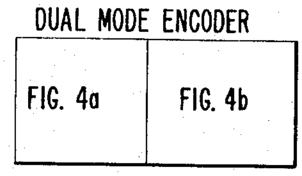
FIG. 2 illustrates how
Figure 3:
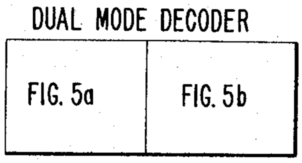
FIG. 3 illustrates how FIGS. 5*a* and 5*b* should be joined serving as a decoding circuit based on the dual word coding techniques.

FIG. 1 illustrates a facsimile system incorporating the dual word coding and the photosensitive memory-scanner techniques of the present invention.

The objective of the system in FIG. 1 is to scan an original document deriving information therefrom, encoding such information, transmitting the information to a remote station, decoding the coded data and operating a printer or the like to produce a copy representative of the original document. As illustrated in FIG. 1 the system includes the photosensitive memory 1 shown in greater detail in FIG. 8. In operation, an original document 2 is positioned as shown in FIG. 9 with informational areas 2*a*, such as alphanumeric information, pictorial information, etc. A light source 4 illuminates document 2. Positioned on the underneath side of document 2 is the photosensitive array 5. As may be observed by reference to FIGS. 8 and 9, the memory serves as a page buffer in this mode and all of the information on document 2 is available for scanning and storing purposes. The scanning is performed by an X address register 6 and a Y address register 7 controlled by control signals on line 8. It is noted that the control signals on line 8 are derived from the dual mode encoder circuits in FIGS. 4*a* and 4*b* and that such pulses occur at a rate that is directly determined by the rate of operation of the encoder. Inputs to memory 1 for selecting the various coordinate locations in the memory are by way of the X address lines designated 6a and the Y address lines designated 7*a*, respectively representative of the outputs of registers 6 and 7 in FIG. 1. One possible way of operating the memory-scanner in FIGS. 1, 8, and 9 is to provide a columnar address on X address line 6*a* to select a particular column of information in the memory and to thereafter scan all bits in the selected column on a bit by bit basis thereby providing an output in a serial bit by bit manner on output line 10 shown both in FIGS. 1 and 8. The rate of output on line 10 is determined by the rate of change on the Y address lines 7*a*. It may be useful at this point to consider the photosensitive memory in some detail.

Memory-Scanner

Figure 6:
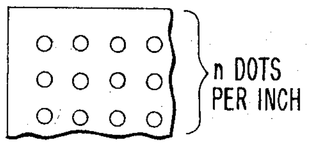
FIGS. 6–9 illustrate various aspects of the photosensitive memory and scanner portion of the system with FIG. 6 showing a mask of uniformly spaced elements in a matrix array.

Consider laying out a mask of uniformly spaced elements in a side by side matrix array form as shown in FIG. 6. This mask can be changed in size such that its number of elements per inch becomes the desired resolution rate of scan. Positioning this mask on some form of substrate or a different material and vaporizing or depositing on the material some type of photosensitive material is done as shown in FIGS. 7*a* and 7*b*. Formed, therefore, is an array of photosensitive elements. This array can be as large as size and cost limitations permit.

When one of these elements is bathed with light, the photosensitive material will generate a current proportional to the amount of light generated. Each photosensitive element can be arranged to set or reset the state of a latch pair in a semiconductor memory; with all bits being written into this memory at the same time. Each bit of this memory can then be addressed as with any conventional memory except that the time and logic taken to write serially into it is eliminated.

Preferably, instead of using latch pairs as the memory elements, only one sensor device is used per bit such that no memory or latching capabilities are available unless the inputs to the device are present. Furthermore, the light source may be controlled such that it can be turned off and on at will. Latching or remembering capabilities of the memory are therefore unnecessary since the light could be kept on the photosensor, thereby presenting an input to the device, for as long as it takes the encoding logic to perform its task.

Refer again to the detailed diagram in FIG. 8. If desired, this matrix can be built as large as 8-½ inches by 11 inches. This single-element-per-bit memory is positionable on the underside of a substrate holding the matrix, such that the only interconnection between the mechanism and the logic are the X and Y memory address lines and the sense output line, and a simple and compact way of scanning and buffering data is thereby available. If a printed page is placed on the array of photosensors and light shines on it as shown in FIG. 9, any photosensor under an effectively black area will have no output; while any photosensor under an effectively white area will have a current generated by it. The light can be kept on the document until all of the encoding logic necesary to describe the printed page without redundancies is performed, at which time the light can be turned off since the data is no longer necessary. The resolution of the scanned text will be the number of photosensors per inch.

There are several advantages to this device. Since the device is all solid state, its reliability is inherently better than most other scanning mechanisms using mechanical moving parts such as a flat bed scanner or a drum scanner. The compactness and relative size of the scanner is an advantage over the relatively large size of other scanners. Since no latching is necessary in the memory, buffer cost can probably be decreased by a factor of two. A truly variable scan rate is achieved, thus providing for faster, and less expensive, facsimile transmission through the use of redundancy reduction in the encoding of source data.

Figure 4A:
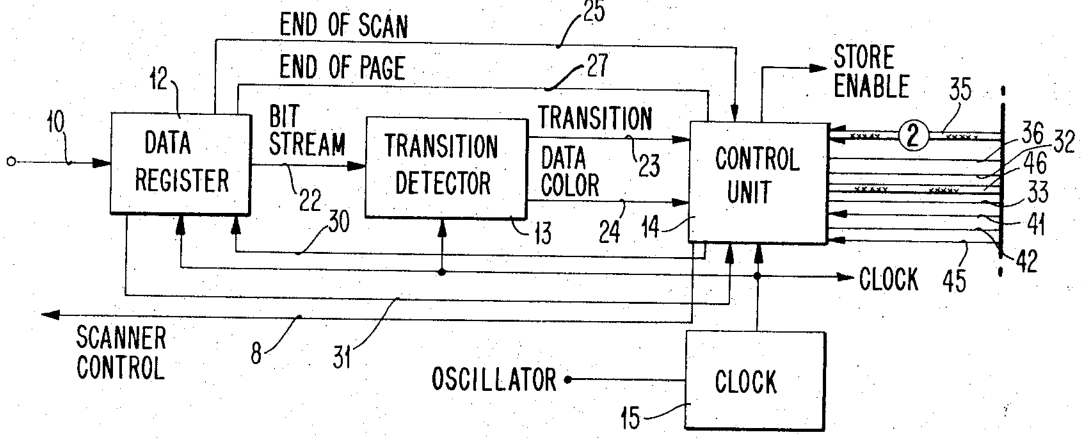
FIGS. 4*a* and 4*b* are to be combined for serving as an encoding means based on the dual word concept.
Figure 4B:
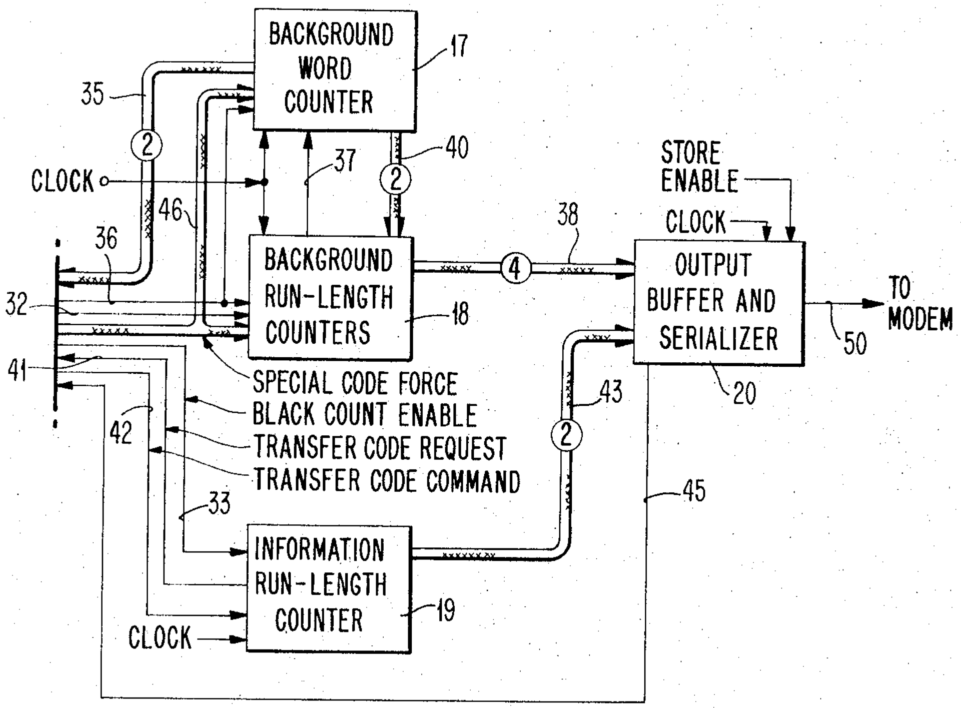
Figure 5A:
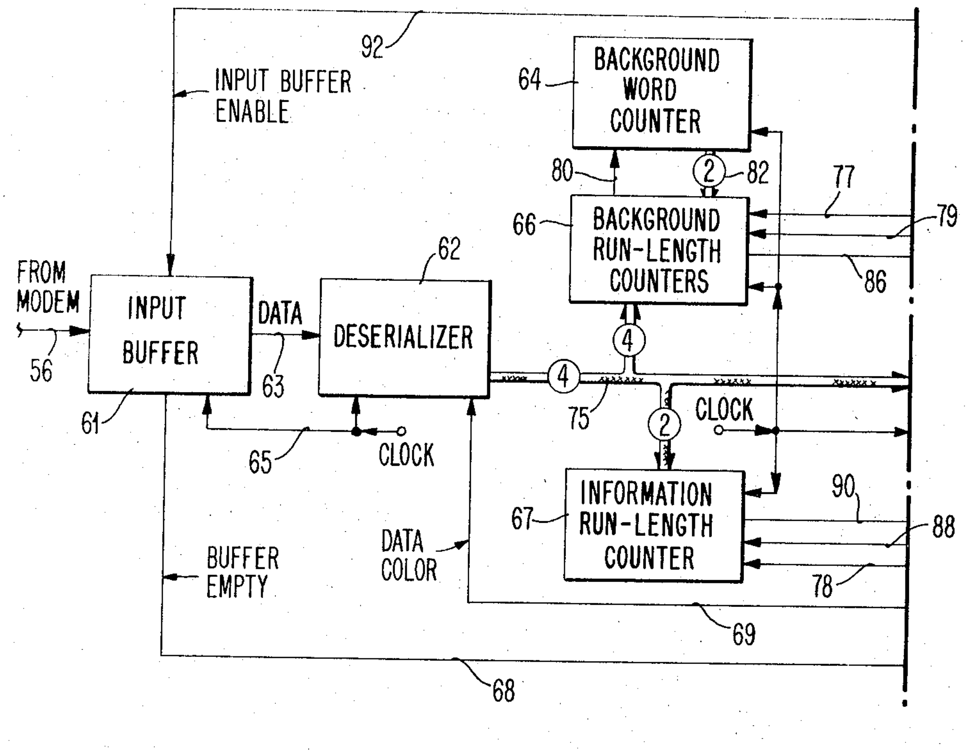
Figure 5B:
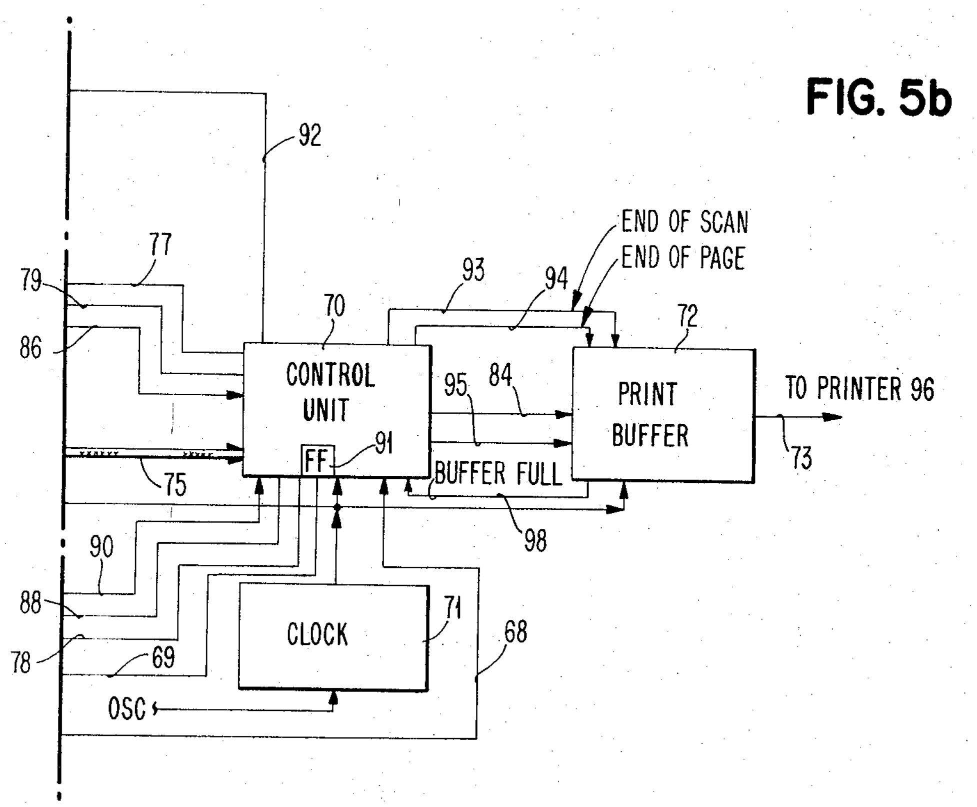

Dual Mode Encoder, FIGS. 4*a* and 4*b*

Continuing with the operation of the facsimile system in FIG. 1, raw data on line 10 is provided to the dual mode encoder shown in greater detail in FIGS. 4*a* and 4*b*. The algorithm upon which the coding scheme is based is indicated below.

Algorithm

Every time that an end of run is detected a flip flop is made to change states. The logic at the encoder or decoder is thus advised that a new run, of color opposite to that of the previous run, is beginning. The logic (either two different sets of logic for each of the two word lengths or one set capable of switching modes) therefore will altnernate between encoding or decoding black and white run lengths.

At the end of each scan (or periodically at intervals which may be shorter or longer than a scan line depending upon error rate of the transmission medium) an end of scan code is sent using whatever word length is necessary. This is done to signify that a "sync" point needs to be established and that the next run coded will be of a color arbitrarily specified beforehand. As could be expected, for most documents this "sync" color will be white since the margin is the first thing to be sent in each line. If this first run after the "sync" point is of a color opposite to that arbitrarily specified, then a run of length zero of the first color must be sent.

The circuits of FIGS. 4*a* and 4*b* include a data register 12, a transition register 13, a control unit 14, a clock 15, a background word counter 17, a background run length counter block 18, an information run length counter 19, and an output buffer and serializer 20. The raw data 10 is inputed into the data register 12. At the clock rate specified by clock 15, data is supplied to the transition detector 13 on line 22. The transition detector 13 will specify on line 23 when a transition has occurred from one data color to another or from information to background and vice versa and will specify on line 24, what the color of the transition is. At the same time, data register 12 will detect on line 25 when the end of the present scan occurs and on line 27 when the end of the page has occurred. On line 30, the control unit will signify to the data register when it should be able to give data to the transition detector. At the same time on line 31, the data register will tell the control unit when no data is available for transmission.

As previously noted, the control unit 14 provides a scanner control signal on line 8 to tell the scanner when it should provide data to the data register 12. Depending on the color of data that the control unit is presently working on, a pulse will come to the run length counters for either the background counters 18 or information counter 19 on lines 32 and 33, respectively, because of the dual base technique used. If a new word is needed for the run length presently being worked on, a pulse is placed on line 37 telling the background word counter 17 that a new word is being used and needs to be transferred when a transition occurs. When a transition occurs on line 23, such that the new word is going to be information, the run length counted in run length counters 18 needs to be transferred to the output buffer and serializer 20 using four data lines 38. To accomplish this purpose, the control unit 14 places a signal on line 36 telling the run length counters 18 to transfer a background word of information to the output buffer and serializer 20. The particular word transferred is determined by the state of the background word counter on line 40. As a word is transferred to the output buffer and serializer 20, the present word being worked on in the background word counter 17 is counted down and the new state of the background word counter is placed on bus 40 to the run length counter 18. When the state of bus 35 from the background word counter 17 to the control unit 14 becomes zero, it is then known that the last background word used was transferred and counting of the information run length needs to proceed using counter 19. When counting an information word length, a signal is placed on line 33, the black count enable line, to tell the information run length counter 19 to count up. When the information run length counter 19 gets to the largest word size that it can count, it will place a pulse on line 41 requesting a transfer code. As control unit 14 sees that the output buffer and serializer 20 can accept a new word, it will place a signal on line 42 representing a transfer code command. Upon this signal, the information run length counter will transfer the information code to the output buffer and serializer 20, on the line pair 43.

If the output rate of the buffer and serializer 20 is less than the input rate, it may fill. If the buffer fills, a signal is placed on line 45 from output buffer and serializer 20 to the control unit 14. A signal on this line signifies that no more codes can be placed in the output buffer and serializer and the hardware must go into an idle state until some codes are put into the transmission line through the modem using line 50, whereupon some new space will be available in the output buffer and serializer 20 and the coding operation will continue.

The system makes use of special codes for several reasons which are not determined by the length of the run presently being worked on. To take advantage of these special codes, a "special code force" signal on lines 46 going from the control unit 14 to the background run length counter 18 and the background word counter 17 has been provided. These lines are used to set a specific pattern on the run length counter and the transfer of this pattern to the output buffer and serializer 20 will proceed in the same manner that an actually counted run length is transferred.

Transmission of Information

The coded data on line 50 is provided to a transmitter 52, FIG. 1 for transmission by way of communication lines 53 to a receiver unit 54 in a manner known in the art. Coded data is provided from receiver 54 on line 56 to the dual mode decoder designated 60 and shown in greater detail in FIGS. *5a* and *5b*.

Dual Mode Decoder

In FIGS. *5a* and *5b*, coded data arrives on line 56 to an input buffer 61. A deserializer 62 serves to accumulate coded words at the length required for decoding. The circuits further include a background word counter 64, a block of background run length counters 66, an information run length counter 67, a control unit 70, an associated clock circuit 71, and a print buffer 72. Buffer 72 has sufficient capacity to store one line of information. Some of these units, such as control unit 70 and print buffer 72 are also illustrated in FIG. 1.

Input data on a serial bit by bit manner comes into the input buffer 61 from the modem on line 56. Data from the input buffer goes into the de-serializer on line 63 at the clocking rate as shown on line 65. Line 68 from input buffer 61 will tell the control unit 70 if the buffer is empty and no data is available for decoding. This may happen many times throughout the transmission of a document since the transmission rate of the modem is slower than the decoding rate of the system. The deserializer converts the serial bit by bit data into word lengths capable of being decoded by the existing set up. A data color line 69 from the control unit 70 to the de-serializer 62 will let the de-serializer know the length of the word that it needs to create depending upon whether it is background or information. As that word is created, it is placed on data bus 75 and depending upon the state of line 69, it will either be placed in the background run length counters or the information run length counter. Using signals on lines 77 and 78 signifying the loading of background and the loading of information code, respectively, the bus 75 also enters the control unit whereby the actual word is decoded. A signal on line 79 controls counting by counters 66. If the word coming in is a high order word, in other words, signifying that another word of that same color is due to arrive, the control unit 70 will not enable the background run length counters to count thru line 79, but rather to wait until the new code arrives. When the low order code for the background run length counter arrives, the background count enable signal on line 79 will be activated and the background run length counters will start counting down at the clock rate. Every time that a new word is loaded into one of the background run length counters 66, a signal is placed on line 80 to the background word counter 64 to signify that a new word position of the run length counters was used. In turn, the background word counter 64 will place on the pair of lines 82, the present word position used. As the background run length counters count the length of the input word, a "zero" bit is placed by the control unit 70 on line 84 to the print buffer 72. This bit is kept on line 84 for every clock time until a signal is placed to the control unit on line 86 by the background run length counter 66 to signify that its count has reached zero. It is assumed that as each low order run length counter reaches zero, the background word counter 64 will count down one and that no signal will be placed on the background-count-equal-to-zero line 86 until all the words of the run length are zero.

The information run length counter works essentially in the same manner as the background run length counters and the background word counter. As the control unit places a signal on line 78 to the information run length counter 67, two bits of the data bus 75 are placed in the register of the information run length counter 67. A signal is provided on line 88, signifying to the run length counter 67 that it is enabled to count the information word. The counting down of this word proceeds at the clock rate and the control unit places a "1" bit on line 84 to the print buffer 72 for every information run length count. This process continues until the information run length counter 67 places a signal on line 90 to the control unit 70 signifying that the information count is now zero. The control unit 70, remembering whether the word in the information run length counter was a high order or a low order information word, will or will not change the state of flip flop 91 to tell the de-serializer 62 whether the next word should be a four bit background word or a two bit information word that needs to be placed on data bus 75.

As the run length is being counted down by the various counters no new data can come into the de-serializer 62 from the input buffer 61 on data line 63. To prevent this, a line 92 called input enable signals the input buffer when it can load data into the de-serializer 62 on data line 63.

An end of scan signal or end of page signal from the photosensitive scanner memory are signified by special codes by the dual word encoder. When control unit 70 of the dual mode decoder detects one of these two special codes, it places a signal on lines 93 or 94 to signify to the print buffer 72 that either an end of scan or an end of page condition was detected. Upon an end of scan condition, the print buffer releases the line of data it is holding to printer 96 via line 73.

The printer 96 comprises a cylindrical member 100 mounting a record sheet 101 and an associated print head 102 driven by means 103 such as a lead screw or the like. Means 103 in turn is driven by motor 104 that also drives cylindrical member 100. The operation of the printer 96 is such that individual lines of information are projected by print head 102 onto document 101 on a line by line basis by relatively moving member 100 and print head 102 in order to ultimately form an entire page of information. Whenever print buffer 72 has an entire line of information, this is indicated to control unit 70, on the buffer full line 98. Control unit 70 signals print buffer 72 on line 97 to release data to the printer 96.

In summary, the one-dimensional method of coding not only exploits the redundancy contained in the background or white bits of printed material, but also uses the redundancy inherently contained in the information bits as well. This scheme of coding uses a dual word concept, thereby coding the runs of one color with a codeword different from that which would be used to code a run of the same length in the opposite color. These codewords are most efficiently assigned after knowing a priori the probability distribution of the run lengths or using a pre-scan or adaptive scheme to obtain them for each separate document. The efficiency of this coding scheme closely matches that obtained by sophisticated two-dimensional schemes such as predictive coding using interline dependency.

The example described herein uses two specific sets of linked fixed word length codes, but any set of these codes as well as any other set of codes for encoding of run lengths could have been used just as well.

By incorporating the photosensitive memory-scanner, previously discussed, a highly efficient system is realized.

While the invention has been particularly shown and described in connection with a preferred embodiment thereof, it will be evident to skilled in the art that various changes in form and detail may be made without departing from the spirit and scope of the invention.

What is claimed is:

1. Dual mode compression apparatus for data processing in a facsimile system or the like, said data being classified into at least two types of data, such as background data and information data in an original document, comprising:

a data source, said data source providing raw data in said at least two types in the form of binary digits 0 and 1, where typically 0 bits represent background data and 1 bits represent information data in said original document;

first run-length encoding means for encoding a first of said types of data using a first set of fixed length data code words wherein each of said first set of fixed length data code words is four bits long and is pre-assigned on a probability distribution of various run lengths of said first data type and including a first set link code word;

second run-length encoding means for encoding a second of said types of data using a second set of fixed length data code words wherein each of said second set of fixed length data code words is two bits long and is pre-assigned on a probability distribution of various run lengths of said second data type and including a second set link code word;

first link means for monitoring encoding of data and responsive to any run-length of said first type of data exceeding the run-length capacity of said first set of code words for providing one or more of said first set link code words and at least one data code word solely from said first set of code words to represent said exceeding run-length of said first type of data; and second link means for monitoring encoding of data and responsive to any run-length of said second type of data exceeding the run-length capacity of said second set of code words for providing one or more of said second set link code words and at least one data code word solely from said second set of code words to represent said exceeding run-length of said second type of data.

2. The apparatus of claim 1, further comprising:

a photomemory having a plurality of sensor means arranged in matrix format in an array at least as large as an original document to be sensed;

means for positioning an original document adjacent said photomemory; and scanning means for initiating a serial scanning operation of said photomemory in order to provide said two types of data for encoding purposes.

3. The apparatus of claim 1, further comprising:

means for transmitting said data words;

first run-length decoding means for decoding a first of said types of data using said first set of fixed length code words; and second run length decoding means for decoding a second of said types of data using said second set of fixed length code words.

* * * * *